(12) United States Patent
Chen et al.

(10) Patent No.: US 11,509,934 B2
(45) Date of Patent: Nov. 22, 2022

(54) METHOD AND APPARATUS OF ENHANCED MULTIPLE TRANSFORMS AND NON-SEPARABLE SECONDARY TRANSFORM FOR VIDEO CODING

(71) Applicant: MEDIATEK INC., Hsinchu (TW)

(72) Inventors: Ching-Yeh Chen, Hsinchu (TW); Tzu-Der Chuang, Hsinchu (TW); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 16/494,586

(22) PCT Filed: Mar. 13, 2018

(86) PCT No.: PCT/CN2018/078782
§ 371 (c)(1),
(2) Date: Sep. 16, 2019

(87) PCT Pub. No.: WO2018/166429
PCT Pub. Date: Sep. 20, 2018

(65) Prior Publication Data
US 2021/0120269 A1 Apr. 22, 2021

Related U.S. Application Data

(60) Provisional application No. 62/511,369, filed on May 26, 2017, provisional application No. 62/472,001, filed on Mar. 16, 2017.

(51) Int. Cl.
*H04N 19/122* (2014.01)
*H04N 19/60* (2014.01)
(Continued)

(52) U.S. Cl.
CPC ......... *H04N 19/60* (2014.11); *H04N 19/122* (2014.11); *H04N 19/176* (2014.11); *H04N 19/18* (2014.11); *H04N 19/96* (2014.11)

(58) Field of Classification Search
CPC .... H04N 19/60; H04N 19/122; H04N 19/176; H04N 19/18; H04N 19/96
See application file for complete search history.

(56) References Cited

U.S. PATENT DOCUMENTS 9,300,973 B2 * 3/2016 Lee ................. H04N 19/159
9,723,313 B2 8/2017 Yang et al.
(Continued)

FOREIGN PATENT DOCUMENTS

CN 102045560 A 5/2011
WO 2015/149698 A1 10/2015
(Continued)

OTHER PUBLICATIONS

International Search Report dated Jun. 1, 2018, issued in application No. PCT/CN2018/078782.
(Continued)

*Primary Examiner* — Dave Czekaj
*Assistant Examiner* — Berteau Joisil
(74) *Attorney, Agent, or Firm* — McClure, Qualey & Rodack, LLP

(57) ABSTRACT

A method and apparatus for video coding incorporating enhanced multiple transform (EMT) are disclosed. According to one method, the number of candidates for EMT in the horizontal direction or vertical direction is reduced depending on the current block size. According to another method, an EMT flag, one or more EMT indices or both are signalled only if the total number of non-zero coefficients in at least a part of the 2D coefficient block is greater than a threshold, where the threshold is equal to 1 or larger. A method and
(Continued)

MxM　　　　M/2xM　　　　MxM/2　　　　M/2xM/2

M/4xM (L)　　M/4xM (R)　　MxM/4 (U)　　MxM/4 (D)

apparatus for video coding using non-separable secondary transform (NSST) are disclosed. According to this method, a total number of non-zero first coefficients in a partial block of the 2D coefficient block is determined and used to determine whether to apply the NSST process.

24 Claims, 8 Drawing Sheets

(51) Int. Cl.
  *H04N 19/176* (2014.01)
  *H04N 19/18* (2014.01)
  *H04N 19/96* (2014.01)

(56) References Cited

U.S. PATENT DOCUMENTS

| | | | | |
|---|---|---|---|---|
| 2011/0310976 | A1* | 12/2011 | Wang | H04N 19/46 |
| | | | | 375/240.24 |
| 2012/0127003 | A1* | 5/2012 | Shibahara | H04N 19/18 |
| | | | | 341/87 |
| 2015/0003514 | A1 | 1/2015 | Hsu et al. | |
| 2016/0219290 | A1* | 7/2016 | Zhao | H04N 19/129 |
| 2020/0359025 | A1* | 11/2020 | Naser | H04N 19/176 |

FOREIGN PATENT DOCUMENTS

| | | |
|---|---|---|
| WO | 2016/070808 A1 | 5/2016 |
| WO | 2019/008366 A1 | 1/2019 |

OTHER PUBLICATIONS

Chen, J., et al.; "Algorithm Description of Joint Exploration Test Model 5 (JEM 5);" Joint Video Exploration Team (JVET) of ITU-T SG 16 WP 3 and ISO/IEC JTC 1/SC 29/WG 11; Jan. 2017; pp. 1-44.
Jang, H., et al..; "Adaptive NSST Kernel Size Selection;" Joint Video Exploration Team (JVET) of ITU-T SG 16 WP 3 and ISO/IEC JTC 1/SC 29/WG 11; Jan. 2017; pp. 1-6.
European Search Report dated Jul. 14, 2020, issued in application No. EP 18768344.6.
Chinese language office action dated Sep. 29, 2020, issued in application No. CN 201880015759.3.

* cited by examiner

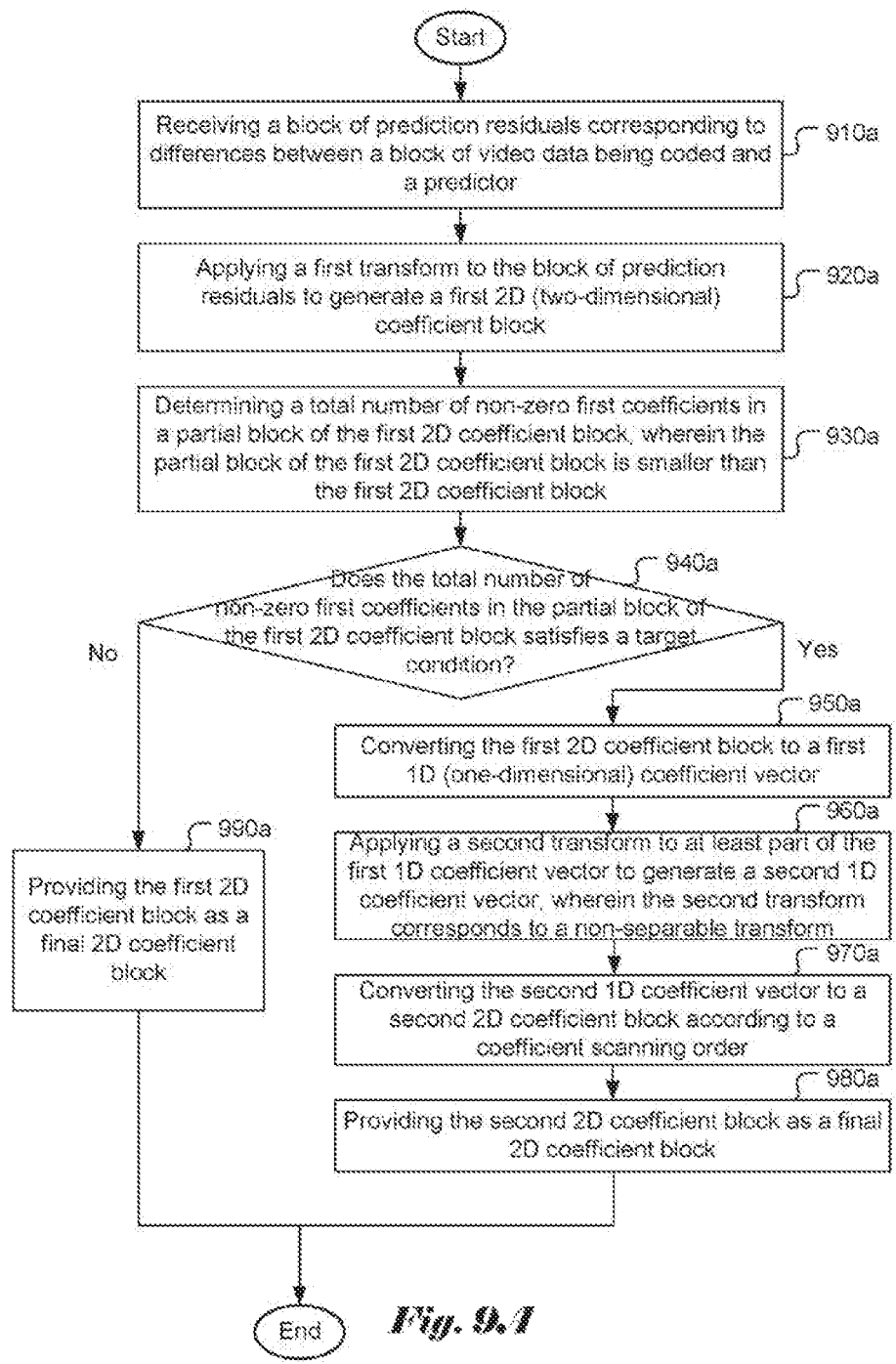
Fig. 9.1

METHOD AND APPARATUS OF ENHANCED MULTIPLE TRANSFORMS AND NON-SEPARABLE SECONDARY TRANSFORM FOR VIDEO CODING

CROSS REFERENCE TO RELATED APPLICATIONS

The present invention claims priority to U.S. Provisional Patent Application, Ser. No. 62/472,001, filed on Mar. 16, 2017 and U.S. Provisional Patent Application, Ser. No. 62/511,369, filed on May 26, 2017. The U.S. Provisional Patent Applications are hereby incorporated by reference in their entireties.

FIELD OF THE INVENTION

The invention relates generally to video processing. In particular, the present invention relates to techniques to improve coding efficiency or reduce complexity for video coding systems using Enhanced Multiple Transforms (EMT) or Non-Separable Secondary Transform (NSST).

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU or can be split into four smaller units of equal sizes (i.e., M/2×M/2), which are nodes of coding tree. If units are leaf nodes of coding tree, the units become CUs. Otherwise, the quadtree splitting process can be iterated until the size for a node reaches a minimum allowed CU size as specified in the SPS. This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

One or more prediction units (PU) are specified for each CU. Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2. Unlike the CU, the PU may only be split once. The partitions shown in the second row correspond to asymmetric partitions, where the two partitioned parts have different sizes.

After obtaining the residual block by applying the prediction process based on the PU splitting type, a CU can be partitioned into transform units (TUs) according to another quadtree structure, which is analogous to the coding tree for the CU. In FIG. 1, the solid lines in block 110 indicate CU boundaries, and dotted lines in block 110 indicate TU boundaries. Similarly, the solid lines for the partition tree structure 120 corresponds to the CU partition tree structure and the dashed lines for the partition tree structure 120 corresponds to the TU partition tree structure. The TU is a basic representative block of residual or transform coefficients for applying the integer transform and quantization. For each TU, one integer transform with the same size is applied to the TU to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure can be used as disclosed in ITU-T SG 16 (Study Period 2013), Contribution 966 (J. An, et al, "Block partitioning structure for next generation video coding", ITU-T T13 SG16 COM 16—C 966 R3—E, Geneva, September 2015). In the disclosed binary tree partitioning structure, a block can be recursively split into two smaller blocks. There are several splitting types as shown in FIG. 3. The most efficient and simplest ones are the symmetric horizontal and vertical splits as shown in the top two splitting types in FIG. 3. Therefore, a system may choose to only use these two splitting types. For a given block of size M×N (in which, M and N can be identical or different), a flag can be signalled to indicate whether to split a block into two smaller blocks. If the flag indicates "yes", another syntax element is signalled to indicate which splitting type is used (i.e., horizontal or vertical). If the horizontal splitting is used then it is split into two blocks of size M×N/2, otherwise if the vertical splitting is used then it is split into two blocks of size M/2×N. The binary tree splitting process can be iterated until the size (width or height) for a splitting block reaches a minimum allowed block size (width or height) that can be defined in high level syntax such as SPS (sequence parameter set). Since the binary tree has two splitting types (i.e., horizontal and vertical), the minimum allowed block width and height should be both indicated. Non-horizontal splitting is implicit when the splitting would result in a block height smaller than the indicated minimum. Non-vertical splitting is implicit when splitting would result in a block width smaller than the indicated minimum. FIG. 4 illustrates an example of block partitioning 410 and its corresponding binary tree structure 420. In each splitting (i.e., non-leaf) node of the binary tree, one flag indicates which splitting type (horizontal or vertical) is used, 0 indicates horizontal splitting and 1 indicates vertical splitting.

The proposed binary tree structure can be used for partitioning a block into multiple smaller blocks such as partitioning a slice into CTUs, a CTU into CUs, a CU into PUs, or a CU into TUs, and so on. In one embodiment, the binary tree is used for partitioning a CTU into CUs. In other words, the root node of the binary tree is a CTU and the leaf nodes of the binary tree are CUs. The leaf nodes are further processed by prediction and transform coding. In another embodiment, there is no further partitioning from CU to PU or from CU to TU to simplify the block partitioning process. That means the CU is equal to the PU and also equal to TU. Therefore, the leaf nodes of the binary tree are also the basic unit for prediction and transform coding in this case.

Binary tree structure is more flexible than quadtree structure, since much more partition shapes can be supported, which is also a factor for coding efficiency improvement. However, the encoding complexity will also increase in order to select the best partition shape. In order to balance the complexity and coding efficiency, a method to combine the quadtree and binary tree structure has been adopted in JVET-E1001 (Chen et al., "*Algorithm Description of Joint Exploration Test Model 5 (JEM 5)*", Joint Collaborative Team on Video Coding of ITU-T SG16 WP3 and ISO/IEC JTC1/SC29/WG11, 5th Meeting: Geneva, CH, 12-20 Jan. 2017, Document: JVET-E1001), which is called quadtree plus binary tree (QTBT) structure. In the disclosed QTBT structure, a block is firstly partitioned by a quadtree structure, the quadtree splitting can be iterated until the size for a splitting block reaches the minimum allowed quadtree leaf node size. If the leaf quadtree block is not larger than the maximum allowed binary tree root node size, it can be further partitioned by a binary tree structure, the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT structure 520. The solid lines indicate quadtree splitting and dotted lines indicate binary tree splitting. In each splitting (i.e., non-leaf) node of the binary tree, one flag indicates which splitting type (horizontal or vertical) is used, 0 indicates horizontal splitting and 1 indicates vertical splitting.

The disclosed QTBT structure can be used for partitioning a block into multiple smaller blocks such as partitioning a slice into CTUs, a CTU into CUs, a CU into PUs, or a CU into TUs, and so on. For example, the QTBT can be used for partitioning a CTU into CUs, i.e., the root node of the QTBT is a CTU, which is partitioned into multiple CUs by a QTBT structure. The CUs are further processed by prediction and transform coding. Simplification of the QTBT structure has been also disclosed in PCT/CN2015/096761, filed on Dec. 9, 2015, where no further partitioning is applied from CU to PU or from CU to TU. In other words, a CU is equal to a PU and is also equal to a TU. Therefore, the leaf node of the QTBT structure is the basic unit for prediction as well as for transform.

An example of the disclosed QTBT structure is shown as follows. The QTBT structure may be applied to a CTU with size 128×128, the minimum allowed quadtree leaf node size is equal to 16×16, the maximum allowed binary tree root node size is equal to 64×64, the minimum allowed binary tree leaf node width and height both are equal to 4, and the maximum allowed binary tree depth is equal to 4. Firstly, the CTU is partitioned by a quadtree structure and the leaf quadtree unit may have a size from 16×16 (minimum allowed quadtree leaf node size) to 128×128 (equal to CTU size, i.e., no split). If the leaf quadtree unit is 128×128, it cannot be further split by the binary tree since the size exceeds the maximum allowed binary tree root node size 64×64. Otherwise the leaf quadtree unit can be further split by binary tree. The leaf quadtree unit is used as the root binary tree unit that has binary tree depth of 0. When the binary tree depth reaches 4 (i.e., the indicated maximum binary tree depth), non-splitting is implicit. When the binary tree node has width equal to 4, non-horizontal splitting is implicit. When the binary tree node has height equal to 4, non-vertical splitting is implicit. The leaf nodes of the QTBT are further processed by prediction (e.g., Intra picture or Inter picture) and transform coding.

The disclosed tree structure can be applied separately to luma and chroma for the I-slice (i.e., Intra coded slice) and applied simultaneously to both luma and chroma (except when certain minimum sizes are reached for chroma) for the P- and B-slice. In other words, in the I-slice, the luma CTB has its QTBT-structured block partitioning, and the two chroma CTBs have another QTBT-structured block partitioning. The two chroma CTBs may also have their own QTBT-structured block partitioning.

For each TU, one integer transform having the same size to the TU is applied to obtain residual coefficients. These coefficients are transmitted to the decoder after quantization on a TU basis. HEVC adopts Discrete Cosine Transform type II (DCT-II) as its core transform because it has a strong "energy compaction" property. Most of the signal information tends to be concentrated in a few low-frequency components of the DCT-II, which approximates the Karhunen-Loève Transform (KLT). As is known in the field of data compression, KLT is optimal in the decorrelation sense for signals based on certain limits of Markov processes. The N-point DCT-II of the signal f[n] is defined as (1).

$$\hat{f}_{DCT-II}[k] = \lambda_k \frac{2}{\sqrt{N}} \sum_{n=0}^{N-1} f[n] \cos\left[\frac{k\pi}{N}\left(n+\frac{1}{2}\right)\right], \quad (1)$$

$$k = 0, 1, 2, \ldots, N-1, \lambda_k = \begin{cases} 2^{-0.5}, & k = 0 \\ 1, & k \neq 0 \end{cases}$$

For Intra-predicted residue, other transforms may be more efficient than DCT-II. In contributions including JCTVC-B024, JCTVC-C108 and JCTVC-E125 made to various JCT-VC meetings (Joint Collaborative Team on Video Coding of ITU-T SG16 WP3 and ISO/IEC JTC1/SC29/WG11), Discrete Sine Transform (DST) was introduced to be used an alternative to DCT for oblique Intra modes. For Inter-predicted residue, DCT-II is the only transform used in current HEVC. However, the DCT-II may not the optimal transform for all cases. In JCTVC-G281 (Joint Collaborative Team on Video Coding of ITU-T SG16 WP3 and ISO/IEC JTC1/SC29/WG11, 7th Meeting: Geneva, CH., 21-30, Nov. 2011, Document: JCTVC-G281), the Discrete Sine Transform type VII (DST-VII) and Discrete Cosine Transform type IV (DCT-IV) are proposed to replace DCT-II in some cases. Also, in JVET-E1001, an Enhanced Multiple Transform (EMT) scheme is used for residual coding for both Intra and Inter-coded blocks. In the literature, the EMT may also be referred as Adaptive Multiple Transform (AMT). It utilizes multiple selected transforms from the DCT/DST families other than the current transforms in HEVC. The newly introduced transform matrices are DST-VII, DCT-VIII, DST-I and DCT-V. Table 1 summarizes the transform basis functions of each transform for N-point input.

According to EMT, multiple transforms can be selected for one TU. For example, for Inter CUs, one EMT flag can be coded to indicate that the HEVC transform is used (i.e., EMT flag equal to zero) or one of the new multiple transforms is used (i.e., EMT flag equal to one). When EMT flag is equal to one, there are two kinds of different transforms in horizontal and vertical directions, respectively. An EMT index may be used to indicate the transform selected for each of the horizontal and vertical directions. Overall, four different transforms are supported for each CU when EMT flag is one. For Intra CUs, there are also four candidates in multiple transforms. However, these four candidates are variants according to Intra prediction direction.

When more and more transforms are used for coding, the signalling for multiple transforms becomes more complicated. The bit rate for signalling also becomes higher. However, due to its higher compression efficiency, the overall coding performance may still be improved by the multiple transform schemes.

In JEM-4.0 (i.e., the reference software for JVET, Joint Video Exploration Team of ITU-T SG 16 WP 3 and ISO/IEC JTC 1/SC 29/WG 11), a total of 35×3 non-separable secondary transforms (NSST) are used for both 4×4 and 8×8 TU sizes, where 35 is the number of transform sets specified by the Intra prediction mode, and 3 is the number of NSST candidates for each Intra prediction mode. The value of transform set is derived according to Table 2 below.

TABLE 1

Transform basis functions for N-point input

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

TABLE 2

Mapping from Intra prediction mode to transform set index

| Intra mode | 0 | 1 | 2 | 3 | 4 | 5 | 6 | 7 | 8 | 9 | 10 | 11 | 12 | 13 | 14 | 15 | 16 |
| set | 0 | 1 | 2 | 3 | 4 | 5 | 6 | 7 | 8 | 9 | 10 | 11 | 12 | 13 | 14 | 15 | 16 |
| Intra mode | 17 | 18 | 19 | 20 | 21 | 22 | 23 | 24 | 25 | 26 | 27 | 28 | 29 | 30 | 31 | 32 | 33 |
| set | 17 | 18 | 19 | 20 | 21 | 22 | 23 | 24 | 25 | 26 | 27 | 28 | 29 | 30 | 31 | 32 | 33 |
| Intra mode | 34 | 35 | 36 | 37 | 38 | 39 | 40 | 41 | 42 | 43 | 44 | 45 | 46 | 47 | 48 | 49 | 50 |
| set | 34 | 33 | 32 | 31 | 30 | 29 | 28 | 27 | 26 | 25 | 24 | 23 | 22 | 21 | 20 | 19 | 18 |
| Intra mode | 51 | 52 | 53 | 54 | 55 | 56 | 57 | 58 | 59 | 60 | 61 | 62 | 63 | 64 | 65 | 66 | 67(LM) |
| set | 17 | 16 | 15 | 14 | 13 | 12 | 11 | 10 | 9 | 8 | 7 | 6 | 5 | 4 | 3 | 2 | Null |

For NSST, the size of secondary transform is selected depending on the transform size. For example, if both width (W) and height (H) of the block are larger than 4, the 8×8 NSST is applied. Otherwise, the 4×4 NSST is applied. In addition, the secondary transform is applied only when the number of non-zero coefficients is greater than the threshold. An exemplary flowchart for selecting the size of secondary transform at a decoder side is shown in FIG. 6. In FIG. 6, the where the number of non-zero coefficients (i.e., nonZero-Coef) of the current TU is greater than a threshold (i.e., Thr) is checked in step 610. If the result is not true (i.e., the "no" path), no NSST is applied as shown in step 670. If the result is true (i.e., the "yes" path), the ROT index (i.e., ROT idx) is parsed from the bitstream in step 620. In step 630, whether the rotational transform index (i.e., ROT idx) is equal to 0 is checked. If ROT idx is equal to 0 (i.e., the "yes" path), no NSST is applied as shown in step 670. Otherwise (i.e., the "no" path from step 630), whether the block size is larger than or equal to 8×8 is checked in step 640. If the block size is larger than or equal to 8×8, (i.e., the "yes" path from step 640), NSST using 8×8 kernel is applied as shown in step 660. Otherwise (i.e., the "no" path from step 640), NSST using 4×4 kernel is applied as shown in step 650. When the NSST is applied, the non-separable transform is performed on the top-left R×S region of a transform coefficient block, where R corresponds to min (8, W) (i.e., minimum of 8 and W) and S corresponds to min (8, H) (i.e., minimum of 8 and H). The above transform selection rule is applied to both luma and chroma components. The kernel size of secondary transform depends on the current coding block size. For blocks larger than 8×8, the 8×8 NSST is always applied. As disclosed in JVET-E0047 (H. Jang, et al., "Adaptive NSST Kernel Size Selection," Joint Collaborative Team on Video Coding of ITU-T SG16 WP3 and ISO/IEC JTC1/SC29/WG11, 5th Meeting: Geneva, CH, 12-20 Jan. 2017, Document: JVET-E0047), larger blocks may have non-zero coefficients existing in the low-frequency area such as the 4×4 sub-block region. Therefore, the best secondary transform is not always 8×8 NSST.

A more generalized NSST selection method can further improve the coding performance. An exemplary flowchart of selecting a secondary transform kernel size for blocks larger than 8×8 at a decoder side is shown in FIG. 7. The flowchart corresponds to a modified flowchart based on the flowchart in FIG. 6. When the test result in step 640 is true (i.e., the "yes" path), the NSST kernel size flag (i.e., nsst_krnl_size_flag) is parsed as shown in step 710. The value of nsst_krnl_size_flag is checked in step 720. If nsst_krnl_size_flag is equal to 0, NSST using 8×8 kernel is applied as shown in step 660. If nsst_krnl_size_flag is equal to 1, NSST using 4×4 kernel is applied as shown in step 650.

According to the NSST encoding process, a primary transform is applied to an input block to form a primary transform block. In FIG. 6, when the NSST with 4×4 kernel is selected for the primary transform block (4×8 or smaller) as shown in step 650, the top-left 4×4 sub-block of the primary transform block is converted into a 16×1 one-dimensional (1D) coefficient vector. A secondary transform is then selected and applied to the 1D coefficient vector. The secondary transformed coefficient vector is then converted back to a two dimensional (2D) secondary transformed 4×4 block according to a scanning order. This secondary transformed 4×4 block is then used to replace the top-left 4×4 sub-block of the primary transform block to form an NSST modified transform block and subsequent coding process (e.g., quantization and entropy coding) is applied to the NSST modified transform block. In FIG. 6, when the NSST with 8×8 kernel is selected for the primary transform block (8×8 or larger) as shown in step 660, the top-left 8×8 sub-block of the primary transform block is converted into a 64×1 one-dimensional (1D) coefficient vector. A secondary transform is then selected and applied to the 1D coefficient vector. The secondary transformed coefficient vector is then converted back to a two dimensional (2D) secondary transformed 8×8 block according to a scanning order. This secondary transformed 8×8 block is then used to replace the top-left 8×8 sub-block of the primary transform block to form an NSST modified transform block.

However, as reported in JVET-E0047, selecting NSST kernel size for blocks larger than 8×8 can improve coding gain to a certain degree, but incur dramatic encoding time increases. In JVET-E0047, a flag is always used to explicitly signal the NSST kernel size for blocks larger than 8×8, which limits the BD-rate enhancement and requires additional RDO (Rate-Distortion Optimization) checks. Implicit methods to derive the optimal NSST kernel size are also suggested in JVET-E0047 to reduce the bitrate associated with the additional flag and to reduce the required computations. In JEM-4.0, the NSST syntax is signalled when the current TU has two or more non-zero coefficients. The NSST is only performed on the top-left R×S region of a transform coefficient block, where R corresponds to min (8, W) and S corresponds to min (8, H).

It is desirable to develop methods to further improve the coding performance or reducing the complexity for system incorporating EMT or NSST.

BRIEF SUMMARY OF THE INVENTION

A method and apparatus for video encoding or decoding performed by a video encoder or a video decoder incorporating enhanced multiple transform (EMT) are disclosed. According to this method, input data associated with a current block in a current picture are received, where the input data corresponds to the current block to be processed by a forward transform process at an encoder side and the input data corresponds to a current coefficient block to be processed by an inverse transform process at a decoder side. A plurality of transform sets are determined, where each transform set comprises one or more transform candidates, and at least one transform set comprises a plurality of transform candidates. A first transform set is determined from the plurality of transform sets to apply in a horizontal direction to the current block at the encoder side or to the current coefficient block at the decoder side. A second transform set is determined from the plurality of transform sets to apply in a vertical direction to the current block at the encoder side, or to the current coefficient block at the decoder side. At least a first transform is selected from the first transform set or a reduced first transform set, or a second transform is selected from the second transform set or a reduced second transform set. The reduced first transform set has less candidates than the first transform set and the reduced second transform set has less candidates than the second transform set. The current coefficient block is generated according to the current block, the first transform and the second transform at the encoder side, or the current block is recovered according to the current coefficient block, the first transform and the second transform at the decoder side.

In one embodiment, the first transform is selected from the reduced first transform set if a horizontal size of the current block is smaller than or equal to a first threshold or the second transform is selected from the reduced second transform set if a vertical size of the current block is smaller than or equal to the first threshold. For example, the reduced first transform set consists of one candidate if the horizontal size of the current block is smaller than or equal to 4, or the reduced second transform set consists of one candidate if the vertical size of the current block is smaller than or equal to 4.

In another embodiment, the first transform is selected from the reduced first transform set if a horizontal size of the current block is greater than or equal to a second threshold or the second transform is selected from the reduced second transform set if a vertical size of the current block is greater than or equal to the second threshold. For example, the reduced first transform set consists of one candidate if the horizontal size of the current block is greater than or equal to 64, or the reduced second transform set consists of one candidate if the vertical size of the current block is greater than or equal to 64.

In yet another embodiment, the first transform is selected from the reduced first transform set and the second transform is selected from the reduced second transform set if a total number of pixels in the current block is smaller than or equal to a first threshold. For example, the reduced first transform set consists of one candidate and the reduced second transform set consists of one candidate if the total number of pixels in the current block is smaller than or equal to 16.

In still yet another embodiment, the first transform is selected from the reduced first transform set and the second transform is selected from the reduced second transform set if a total number of pixels in the current block is greater than or equal to a second threshold. For example, the reduced first transform set consists of one candidate and the reduced second transform set consists of one candidate if the total number of pixels in the current block is greater than or equal to 4096.

A method and apparatus of video encoding incorporating Non-Separable Secondary Transform (NSST) are disclosed. According to this method, a block of prediction residuals corresponding to differences between a block of video data being coded and a predictor is received. A first transform is applied to the block of prediction residuals to generate a first 2D (two-dimensional) coefficient block. A total number of non-zero first coefficients in a partial block of the first 2D coefficient block is determined, where the partial block of the first 2D coefficient block is smaller than the first 2D coefficient block. If the total number of non-zero first coefficients in the partial block of the first 2D coefficient block satisfies a target condition: the first 2D coefficient block is converted to a first 1D (one-dimensional) coefficient vector; a second transform is applied to at least part of the first 1D coefficient vector to generate a second 1D coefficient vector, where the second transform corresponds to a non-separable transform; the second 1D coefficient vector is converted to a second 2D coefficient block according to a coefficient scanning order; and the second 2D coefficient block is provided as a final 2D coefficient block. If the total number of non-zero first coefficients in the partial block of the first 2D coefficient block does not satisfy the target condition: the first 2D coefficient block is provided as the final 2D coefficient block. The target condition may correspond to the total number of non-zero first coefficients in the partial block of the first 2D coefficient block being greater than a threshold.

In one embodiment, the partial block of the first 2D coefficient block may correspond to a top-left M×N block of the first 2D coefficient block, and wherein M is one positive integer smaller than a width of the first 2D coefficient block and N is one positive integer smaller than a height of the first 2D coefficient block. For example, M and N are selected from a group comprising 4, 8 and 16.

In another embodiment, the partial block of the first 2D coefficient block excludes DC coefficient located at a top-left corner of the first 2D coefficient block.

In yet another embodiment, the block of prediction residuals comprises one luma block and one or more chroma blocks, and one first 2D luma coefficient block and one or more 2D chroma coefficient blocks are generated, and where said determining the total number of non-zero first coefficients counts only non-zero AC coefficients associated with said one or more 2D chroma coefficient blocks. For example, said determining the total number of non-zero first coefficients counts only non-zero AC coefficients for each of said one or more 2D chroma coefficient blocks and selects a maximum number of non-zero AC coefficients as the total number of non-zero first coefficients.

A method and apparatus of video decoding incorporating Non-Separable Secondary Transform (NSST) are disclosed. According to this method, a final 2D (two-dimensional) coefficient block corresponding to differences between a block of video data being coded and a predictor is received. A total number of non-zero first coefficients in a partial block of the final 2D coefficient block is determined, wherein the partial block of the final 2D coefficient block is smaller than the final 2D coefficient block. If the total number of non-zero first coefficients in the partial block of the final 2D coefficient block satisfies a target condition, the final 2D coefficient block is converted to a first 1D (one-dimensional) coefficient vector, a first transform is applied to at least part of the first 1D coefficient vector to generate a second 1D coefficient vector, in which the first transform corresponds to a non-separable transform, the second 1D coefficient vector is converted to a first 2D coefficient block according to a coefficient scanning order, a second transform is applied to the first 2D coefficient block to generate a second 2D coefficient block, and the block of video data is recovered according to the second 2D coefficient block. If the total number of non-zero first coefficients in the partial block of the final 2D coefficient block does not satisfy the target condition, the second transform is applied to the final 2D coefficient block to generate a third 2D coefficient block, and the block of video data is recovered according to the third 2D coefficient block.

In one embodiment, the target condition corresponds to the total number of non-zero first coefficients in the partial block of the final 2D coefficient block being greater than a threshold. The partial block of the final 2D coefficient block corresponds to a top-left M×N block of the final 2D coefficient block, and wherein M is one positive integer smaller than a width of the final 2D coefficient block and N is one positive integer smaller than a height of the final 2D coefficient block. For example, M and N are selected from a group comprising 4, 8 and 16.

In another embodiment, the partial block of the final 2D coefficient block excludes DC coefficient located at a top-left corner of the final 2D coefficient block.

In yet another embodiment, the final 2D coefficient block corresponds to one 2D luma coefficient block and one or more 2D chroma coefficient blocks, and wherein said determining the total number of non-zero first coefficients counts only non-zero AC coefficients associated with said one or more 2D chroma coefficient blocks. For example, said determining the total number of non-zero first coefficients counts only non-zero AC coefficients for each of said one or more 2D chroma coefficient blocks and selects a maximum number of non-zero AC coefficients as the total number of non-zero first coefficients.

Another method and apparatus for video encoding or decoding performed by a video encoder or a video decoder incorporating enhanced multiple transform (EMT) are disclosed. According to this method, input data associated with a current block is received, in which the input data corresponds to a 2D (two-dimensional) coefficient block corresponding to differences between the current block and a predictor. A total number of non-zero first coefficients in at least a part of the 2D coefficient block is determined. An enhanced multiple transform (EMT) flag, one or more EMT indices or both are signalled at an encoder side or parsed from the bitstream at a decoder side only if the total number of non-zero first coefficients in said at least a part of the 2D coefficient block is greater than a threshold, where the threshold is equal to 1 or larger. If the EMT flag is signalled, the EMT flag having a first flag value indicates that no EMT is applied to the current block; and the EMT flag having a second flag value indicates that the EMT is applied to the current block. If said one or more EMT indices are signalled, the EMT associated with a horizontal transform and a vertical transform indicated by said one or more EMT indices is applied to the current block.

In one embodiment, if the EMT flag is not signalled, the EMT flag is inferred to have the first flag value and no EMT is applied to the current block. In another embodiment, if said one or more EMT indices are not signalled, said one or more EMT indices are inferred to be 0.

In one embodiment, different thresholds are selected for to-be-processed blocks corresponding to different coding modes, different colour components, different block sizes, different block widths or different block heights. In another embodiment, the total number of non-zero first coefficients is counted based on a top-left M×N block of the 2D coefficient block, and where M is one positive integer smaller than a width of the 2D coefficient block and N is one positive integer smaller than a height of the 2D coefficient block.

BRIEF DESCRIPTION OF THE DRAWINGS

FIG. 9A illustrates a flowchart for an exemplary encoding system incorporating non-separable secondary transforms (NSST) according to a method of the present invention.

DETAILED DESCRIPTION OF THE INVENTION

Figure 1:
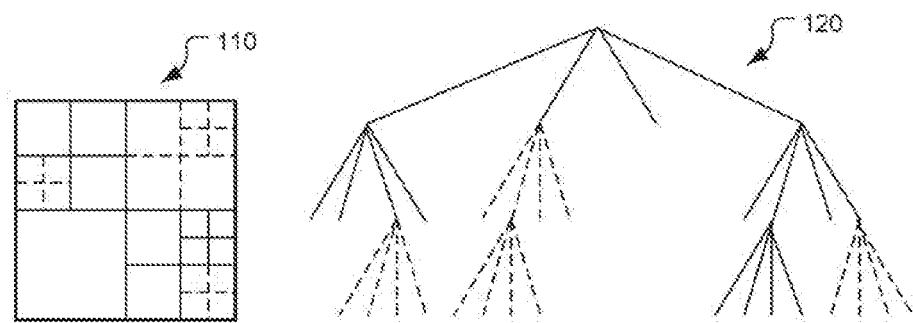
FIG. 1 illustrates the subdivision of a CTU into CUs and TUs using a corresponding quadtree in HEVC (high efficiency video coding).
Figure 2:
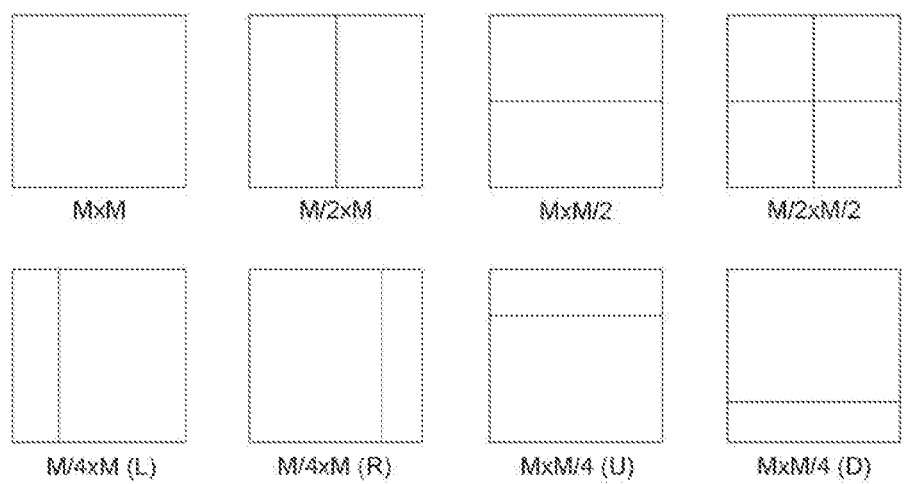
FIG. 2 illustrates the eight partition types for splitting a CU (coding unit) into one or more PUs (prediction units) in HEVC (high efficiency video coding).
Figure 3:
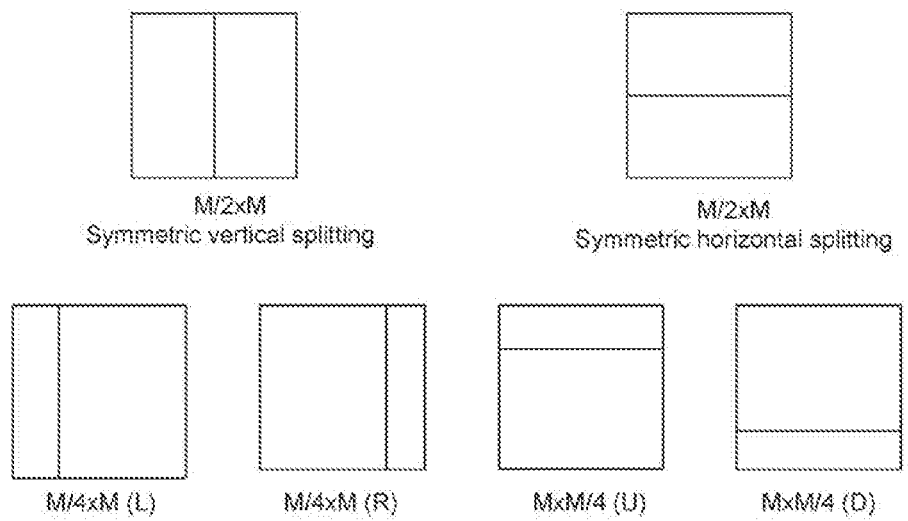
FIG. 3 illustrates the possible splitting types for a binary tree.
Figure 4:
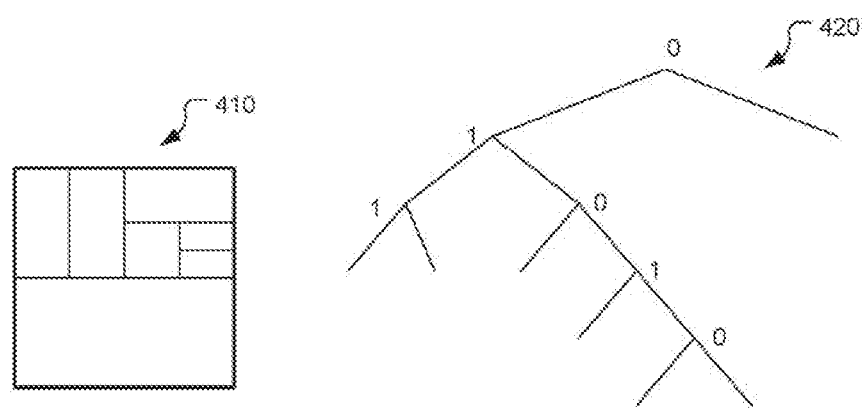
FIG. 4 illustrates an example of block partition using a corresponding binary tree.
Figure 5:
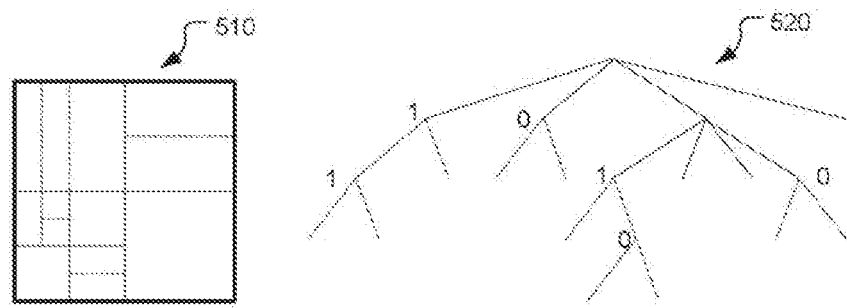
FIG. 5 illustrates an example of block partition using a corresponding quadtree plus binary tree (QTBT).
Figure 6:
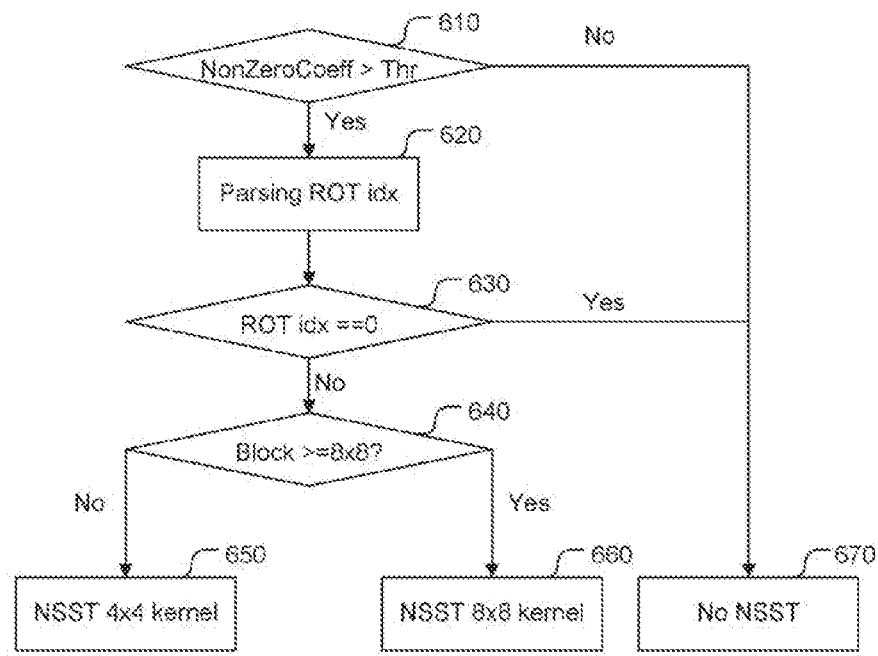
FIG. 6 illustrates an exemplary flowchart for selecting the size of secondary transform according to existing NSST (non-separable secondary transforms) process.
Figure 7:
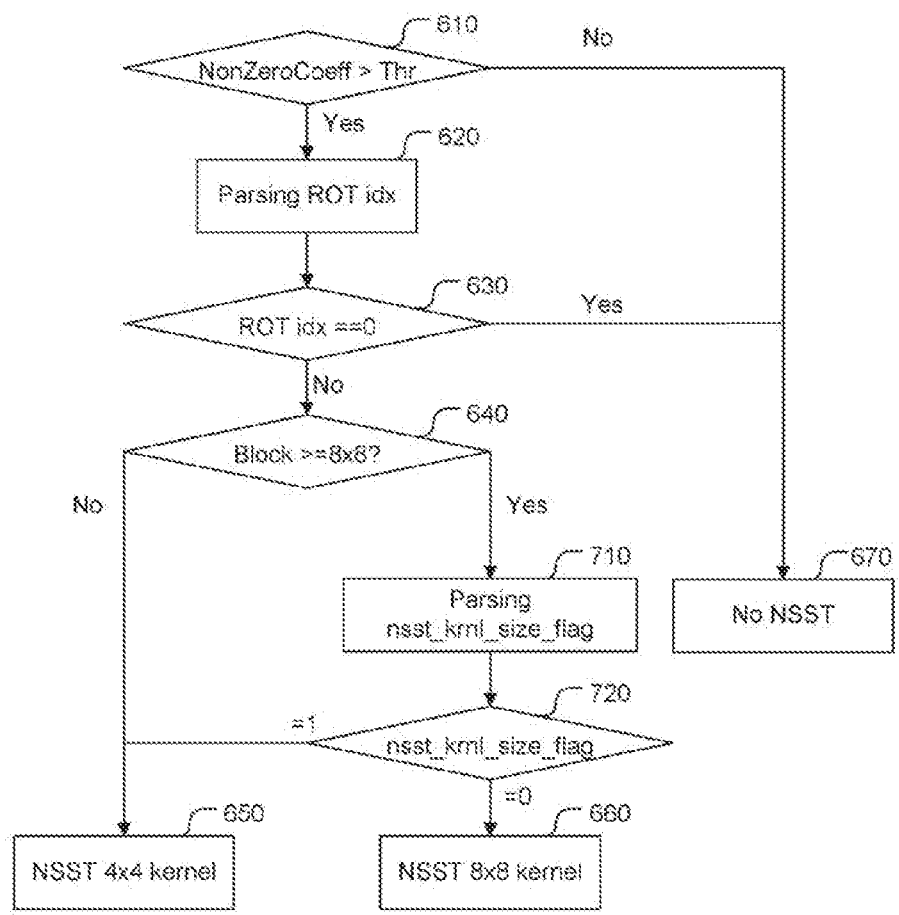
FIG. 7 illustrates an exemplary flowchart for selecting the size of secondary transform according to an improved NSST process.

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the present invention is intended to improve the coding efficiency or reduce complexity associated with enhanced multiple transform (EMT) and non-separable secondary transforms (NSST).

For EMT, currently, there are two kinds of different transforms selected for the horizontal and vertical directions, respectively. Therefore, besides the EMT flag, an additional flag or index for each direction is needed to indicate which transform is used. However, for small CUs, the side information required becomes expensive. On the other hand, for large CUs, the characteristic of prediction errors may not be complicated as that in small CUs. In order to improve the performance of EMT, size-dependent EMT is disclosed in the present invention. For example, for small CUs, only one or two transforms can be selected to reduce the required side information. For large CU, the number of candidates in EMT can be reduced to remove useless candidates in EMT. In one embodiment, the number of candidates in EMT is reduced in one direction if the CU size in this direction is smaller than or equal to a first specific threshold. For example, the number of candidates in EMT is reduced from 2 to 1 in horizontal direction if the horizontal size of the current CU is smaller than or equal to 4, and/or the number of candidates in EMT is reduced from 2 to 1 in vertical direction if the vertical size of the current CU is smaller than or equal to 4. In another embodiment, the number of candidates in EMT is reduced in one direction if the CU size in this direction is greater than or equal to a second specific threshold. For example, the number of candidates in EMT is reduced from 2 to 1 in horizontal direction if the horizontal size of the current CU is greater than or equal to 64, and/or the number of candidates in EMT is reduced from 2 to 1 in vertical direction if the vertical size of the current CU is greater than or equal to 64. In one embodiment, the number of candidates in EMT is reduced if the number of pixels in the CU is smaller than or equal to a third specific threshold. For example, the number of candidates in EMT is reduced from 4 to 1 in horizontal direction and the number of candidates in EMT is reduced from 4 to 1 in vertical direction if the number of pixels in the current CU is smaller than or equal to 16. As mentioned before, there are 4 candidates available for each horizontal and vertical pair since there are two candidates in each of the horizontal and vertical directions. In another embodiment, the number of candidates in EMT is reduced if the number of pixels in the CU is greater than or equal to a fourth specific threshold. For example, the number of candidates in EMT is reduced from 4 to 1 in horizontal direction and the number of candidates in EMT is reduced from 4 to 1 in vertical direction if the number of pixels in the current CU is greater than or equal to 4096. In the foregoing embodiments, whether the number of candidates in EMT is reduced or not is depending on a side length (width or height) or an area of a current CU, however, these two constraints can be combined together.

In JEM-5.0, for EMT, an EMT flag is signalled to indicate whether the EMT is applied when the non-zero coefficients exist. If the flag is true, an EMT index is signalled. To reduce the EMT syntax overhead, the EMT flag and EMT index according to a method of the present invention are conditionally signalled depending on the TU coefficients. In an embodiment, the number of non-zero coefficients is used as a condition for EMT index signalling. For example, if the EMT flag is true, for an Inter or Intra block, the EMT index is signalled only when the number of non-zero coefficients is larger than a threshold. If the EMT index is not signalled, the EMT index is inferred as 0. The threshold can be 1, 2, or 3. The threshold can be different for different block modes (e.g. Inter mode or Intra mode), different components, or different block sizes (the block size can be indicated by the block width, the block height, or the number of pixels in the block). For example, the threshold for smaller TUs can be larger than larger TUs. In another example, the threshold for smaller TUs can be smaller than larger TUs. Multiple EMT indices can be used for row (horizontal) transform and column (vertical) transform. Different thresholds can be applied for the row/column transform. The thresholds can depend on the TU width or height. For example, for a TU, th1 is the row transform threshold while another threshold, th2 is the column transform threshold. If the number of non-zero coefficients is larger than th1 but smaller than th2, the row transforms EMT index is signalled and the column transform EMT index is inferred.

In another embodiment, the EMT flag is signalled according to the number of non-zero coefficients. The EMT flag is signalled only when the number of non-zero coefficients is larger than a threshold. If the EMT flag is not signalled, the EMT flag is inferred as false. This method can be applied for Intra TU only, Inter-TU only, or all kinds of TU.

In one embodiment of the present invention, for the EMT syntax associated with the number of non-zero coefficient, the non-zero coefficients can be the non-zero coefficients of the whole TU or just the non-zero coefficients of top-left M×N block. The M and N can be 4, 8, or 16. The DC coefficient (i.e., the top-left coefficient) can be excluded from counting the number of non-zero coefficients. For example, only the non-zero AC coefficients are counted for the number of non-zero coefficients.

In JEM-5.0, for NSST, an NSST index is signalled when the number of non-zero coefficients is larger than a threshold for the Intra TU. For the number of non-zero coefficient counting in NSST, the non-zero coefficients of the whole TU are calculated. In an embodiment of the present application, it is proposed to just count the non-zero coefficients of top-left M×N block of the current TU. As NSST is only performed on the top-left region (i.e., the top-left M×N block) of the current TU, there is no need to perform the NSST operations if the non-zero coefficient does not exist in the top-left region of the current TU. The M and N can be 4, 8, or 16. In another embodiment, the DC coefficient (the upper-left coefficient) can be excluded from counting the number of non-zero AC coefficients. For example, only the non-zero AC coefficients of the whole TU or only count the non-zero AC coefficients of the upper-left 8×8 block are counted.

In JEM-5.0, the NSST index is separately signalled for luma component and chroma component. The threshold for luma and chroma block can be different. Since the chroma texture is smoother than the luma texture, it usually has smaller AC coefficients. Accordingly, in one embodiment of the present invention, only the chroma AC coefficients are counted and signalled in order to reduce the NSST index.

In JEM-5.0, the numbers of non-zero coefficients of different colour components are counted together for determining the NSST index of the colour components. In one embodiment of the present invention, the maximum number of non-zero coefficients of two colour components is used for NSST index coding.

Figure 8:
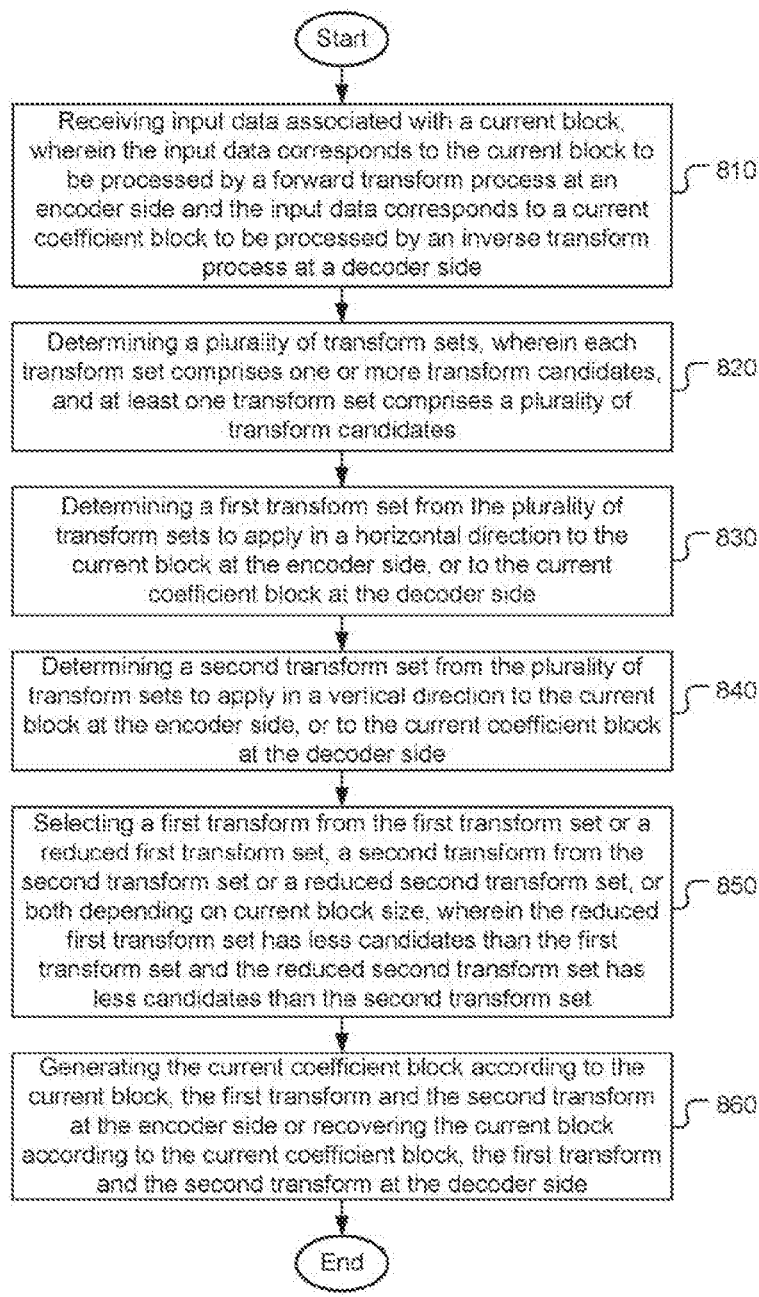
FIG. 8 illustrates a flowchart for an exemplary coding system incorporating enhanced multiple transform (EMT) according to a method of the present invention.

FIG. 8 illustrates a flowchart for an exemplary coding system incorporating enhanced multiple transform (EMT) according to a method of the present invention. The steps shown in the flowchart may be implemented as program codes executable on one or more processors (e.g., one or more CPUs) at the encoder side or the decoder side. The steps shown in the flowchart may also be implemented based on hardware such as one or more electronic devices or processors arranged to perform the steps in the flowchart. According to this method, input data associated with a current image are received in step 810, wherein the input data corresponds to the current block to be processed by a forward transform process at an encoder side and the input data corresponds to a current coefficient block to be processed by an inverse transform process at a decoder side. For example, the input data may correspond to a block of prediction residues to be processed by forward transform to obtain a transform block at the encoder side, or the input data may correspond to a transform block associated with prediction residues and the transform block to be inverse transform to recover the block of prediction residue. A plurality of transform sets are determined in step 820, wherein each transform set comprises one or more transform candidates, and at least one transform set comprises a plurality of transform candidates. A first transform set is determined from the plurality of transform sets to apply in a horizontal direction to the current block at the encoder side, or to the current coefficient block at the decoder side in step 830. A second transform set is determined from the plurality of transform sets to apply in a vertical direction to the current block at the encoder side, or to the current coefficient block at the decoder side in step 840. At least first transform is selected from the first transform set or a reduced first transform set or a second transform is selected from the second transform set or a reduced second transform set depending on current block size in step 850, wherein the reduced first transform set has less candidates than the first transform set and the reduced second transform set has less candidates than the second transform set. The current coefficient block is generated according to the current block, the first transform and the second transform at the encoder side or the current block is recovered according to the current coefficient block, the first transform and the second transform at the decoder side in step 860.

FIG. 9A illustrates a flowchart for an exemplary encoding system incorporating non-separable secondary transforms (NSST) according to a method of the present invention. According to this method, a block of prediction residuals corresponding to differences between a block of video data being coded and a predictor is received in step 910*a*. A first transform is applied to the block of prediction residuals to generate a first 2D (two-dimensional) coefficient block in step 920*a*. A total number of non-zero first coefficients in a partial block of the first 2D coefficient block is determined in step 930*a*, wherein the partial block of the first 2D coefficient block is smaller than the first 2D coefficient block. Whether the total number of non-zero first coefficients in the partial block of the first 2D coefficient block satisfies a target condition is checked in step 940*a*. If the target condition is satisfied (i.e., the "yes" path from step 940*a*), steps 950*a* through 980*a* are performed. Otherwise (i.e., the "no" path from step 940*a*) step 990*a* is performed. In step 950*a*, the first 2D coefficient block is converted to a first 1D (one-dimensional) coefficient vector. In step 960*a*, a second transform is applied to at least part of the first 1D coefficient vector to generate a second 1D coefficient vector, wherein the second transform corresponds to a non-separable transform. In step 970*a*, the second 1D coefficient vector is converted to a second 2D coefficient block according to a coefficient scanning order. In step 980*a*, the second 2D coefficient block is provided as a final 2D coefficient block. In step 990*a*, the first 2D coefficient block is provided as the final 2D coefficient block.

Figure 9B:
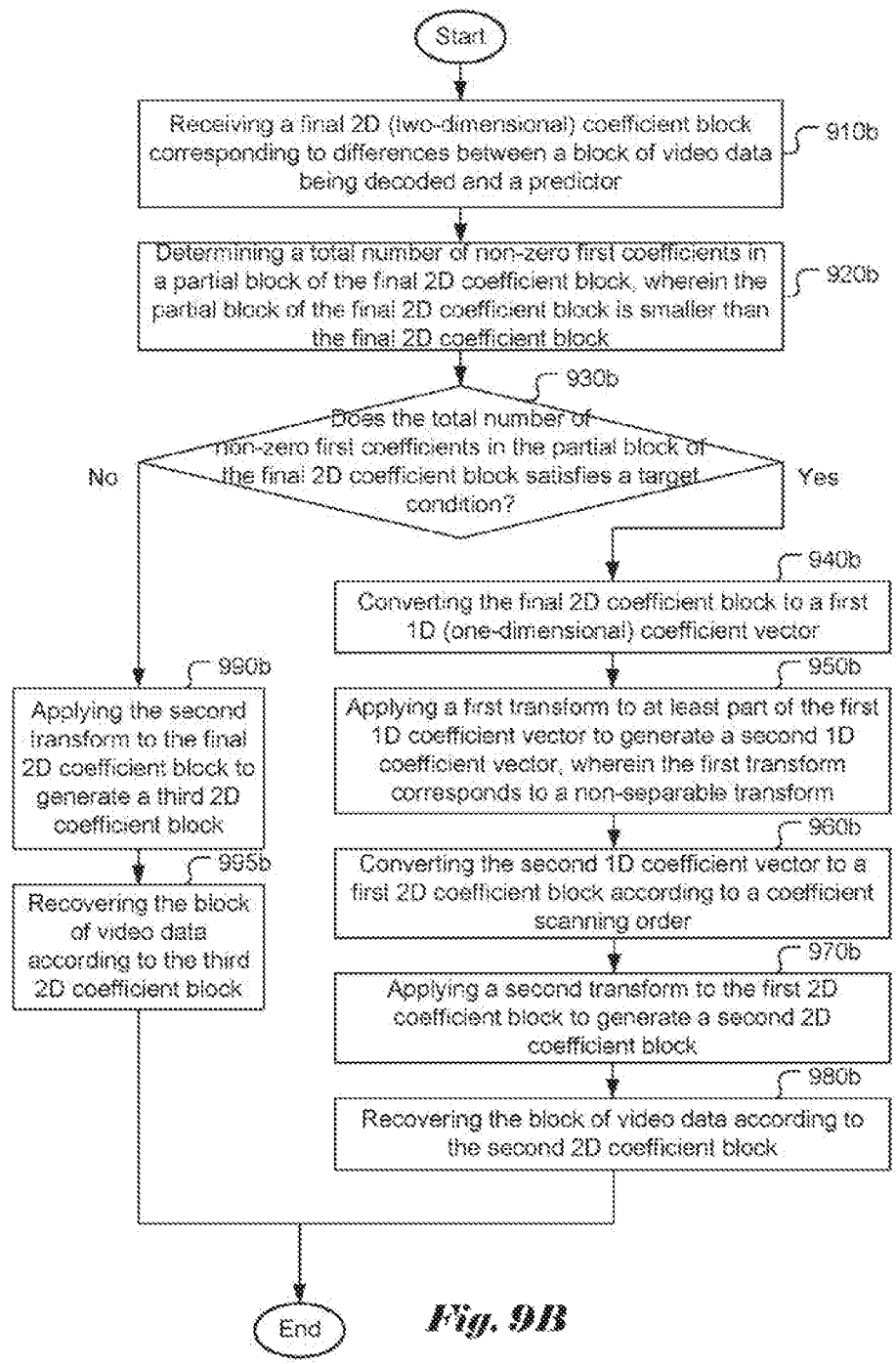
FIG. 9B illustrates a flowchart for an exemplary decoding system incorporating non-separable secondary transforms (NSST) according to a method of the present invention.

FIG. 9B illustrates a flowchart for an exemplary decoding system incorporating non-separable secondary transforms (NSST) according to a method of the present invention. According to this method, a final 2D (two-dimensional) coefficient block corresponding to differences between a block of video data being coded and a predictor is received in step 910*b*. A total number of non-zero first coefficients in a partial block of the final 2D coefficient block is determined in step 920*b*, wherein the partial block of the final 2D coefficient block is smaller than the final 2D coefficient block. As is known in the field, a decoder can derive quantized transform coefficients from received bitstream. Therefore, the decoder is able to know the number of non-zero coefficients. Whether the total number of non-zero first coefficients in the partial block of the final 2D coefficient block satisfies a target condition is checked in step 930*b*. If the target condition is satisfied (i.e., the "yes" path from step 930*b*), steps 940*b* through 980*b* are performed. Otherwise (i.e., the "no" path from step 930*b*) steps 990*b* through 995*b* are performed. In step 940*b*, the final 2D coefficient block is converted to a first 1D (one-dimensional) coefficient vector. In step 950*b*, a first transform is applied to at least part of the first 1D coefficient vector to generate a second 1D coefficient vector, in which the first transform corresponds to a non-separable transform. In step 960*b*, the second 1D coefficient vector is converted to a first 2D coefficient block according to a coefficient scanning order. In step 970*b*, a second transform is applied to the first 2D coefficient block to generate a second 2D coefficient block. In step 980*b*, the block of video data is recovered according to the second 2D coefficient block. In step 990*b*, the second transform is applied to the final 2D coefficient block to generate a third 2D coefficient block. In step 995*b*, the block of video data is recovered according to the third 2D coefficient block. In this embodiment, the action for NSST on and off depending on the number of non-zero coefficients. As is known in the field, the decoder need to parse the related NSST information and perform NSST accordingly when NSST is on.

Figure 10:
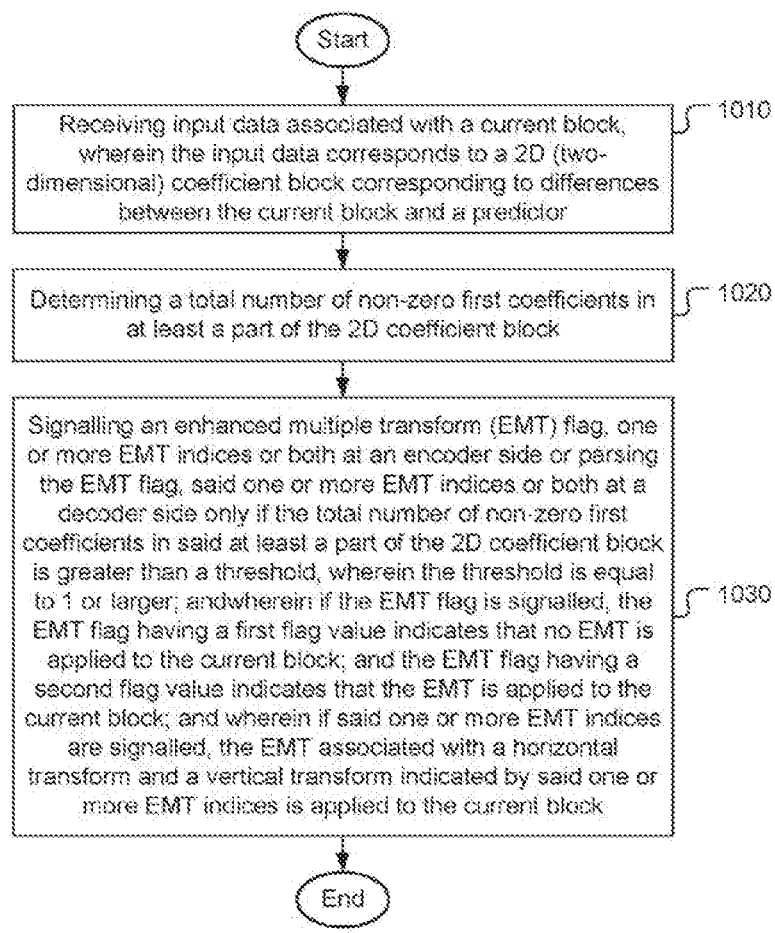
FIG. 10 illustrates a flowchart for an exemplary coding system incorporating enhanced multiple transform (EMT) according to a method of the present invention.

FIG. 10 illustrates a flowchart for an exemplary coding system incorporating enhanced multiple transform (EMT) according to another method of the present invention. According to this method, input data associated with a current block are received in step 1010, in which the input data corresponds to a 2D (two-dimensional) coefficient block corresponding to differences between the current block and a predictor. A total number of non-zero first coefficients in at least a part of the 2D coefficient block is determined in step 1020. For example, the non-zero first coefficients can be the non-zero coefficients of the whole TU or just the non-zero coefficients of upper-left M×N block of the TU. An enhanced multiple transform (EMT) flag, one or more EMT indices corresponding to the selected transform, or both are signalled at an encoder side or parsed from the bitstream at a decoder side only if the total number of non-zero first coefficients in said at least a part of the 2D coefficient block is greater than a threshold, wherein the threshold is equal to 1 or larger in step 1030, wherein if the EMT flag is signalled, the EMT flag having a first flag value indicates that no EMT is applied to the current block; and the EMT flag having a second flag value indicates that the EMT is applied to the current block and wherein if said one or more EMT indices corresponding to the selected transform are signalled, the EMT associated with a horizontal transform and a vertical transform indicated by said one or more EMT indices is applied to the current block.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding or decoding video data using an Enhanced Multiple Transform (EMT) scheme, the method comprising:

receiving input data associated with a current block, wherein the input data corresponds to the current block to be processed by a forward transform process at an encoder side or the input data corresponds to a current coefficient block to be processed by an inverse transform process at a decoder side, the processing at the encoder and decoder sides implemented using the EMT scheme;

determining a plurality of transform sets, wherein each transform set comprises one or more transform candidates, and at least one transform set comprises a plurality of transform candidates;

determining a first transform set from the plurality of transform sets to apply in a horizontal direction to the current block at the encoder side, or to the current coefficient block at the decoder side;

determining a second transform set from the plurality of transform sets to apply in a vertical direction to the current block at the encoder side, or to the current coefficient block at the decoder side;

supplying a first transform from a reduced first transform set corresponding to the first transform set, a second transform from a reduced second transform set corresponding to the second transform set, or both depending on a current block size, wherein the reduced first transform set has less candidates than the first transform set and the reduced second transform set has less candidates than the second transform set; and generating the current coefficient block according to the current block, the first transform and the second transform at the encoder side or recovering the current block according to the current coefficient block, the first transform and the second transform at the decoder side.

2. The method of claim 1, wherein the first transform is selected from the reduced first transform set if a horizontal size of the current block is small than or equal to a first threshold or the second transform is selected from the reduced second transform set if a vertical size of the current block is small than or equal to the first threshold.

3. The method of claim 2, wherein the reduced first transform set consists of one candidate if the horizontal size of the current block is small than or equal to 4, or the reduced second transform set consists of one candidate if the vertical size of the current block is small than or equal to 4.

4. The method of claim 1, wherein the first transform is selected from the reduced first transform set if a horizontal size of the current block is greater than or equal to a second threshold or the second transform is selected from the reduced second transform set if a vertical size of the current block is greater than or equal to the second threshold.

5. The method of claim 4, wherein the reduced first transform set consists of one candidate if the horizontal size of the current block is greater than or equal to 64, or the reduced second transform set consists of one candidate if the vertical size of the current block is greater than or equal to 64.

6. The method of claim 1, wherein the first transform is selected from the reduced first transform set and the second transform is selected from the reduced second transform set if a total number of pixels in the current block is small than or equal to a first threshold.

7. The method of claim 6, wherein the reduced first transform set consists of one candidate and the reduced second transform set consists of one candidate if the total number of pixels in the current block is small than or equal to 16.

8. The method of claim 1, wherein the first transform is selected from the reduced first transform set and the second transform is selected from the reduced second transform set if a total number of pixels in the current block is greater than or equal to a second threshold.

9. The method of claim 8, wherein the reduced first transform set consists of one candidate and the reduced second transform set consists of one candidate if the total number of pixels in the current block is greater than or equal to 4096.

10. An apparatus for encoding or decoding video data using an Enhanced Multiple Transform (EMT) scheme, the apparatus comprising one or more electronic circuits or processors arranged to:

receive input data associated with a current block, wherein the input data corresponds to the current block to be processed by a forward transform process at an encoder side and the input data corresponds to a current coefficient block to be processed by an inverse transform process at a decoder side, the processing at the encoder and decoder sides implemented using the EMT scheme;

determine a plurality of transform sets selected from DCT and DST families, wherein each transform set comprises one or more transform candidates, and at least one transform set comprises a plurality of transform candidates;

determine a first transform set from the plurality of transform sets to apply in a horizontal direction to the current block at the encoder side, or to the current coefficient block at the decoder side;

determine a second transform set from the plurality of transform sets to apply in a vertical direction to the current block at the encoder side, or to the current coefficient block at the decoder side;

select a first transform from a reduced first transform set corresponding to the first transform set, a second transform from a reduced second transform set corresponding to the second transform set, or both depending on a current block size, wherein the reduced first transform set has less candidates than the first transform set and the reduced second transform set has less candidates than the second transform set; and generate the current coefficient block according to the current block, the first transform and the second transform at the encoder side or recover the current block according to the current coefficient block, the first transform and the second transform at the decoder side.

11. A method for encoding video data incorporating non-separable secondary transform (NSST), the method comprising:

receiving a block of prediction residuals corresponding to differences between a block of video data being coded and a predictor;

applying a first transform to the block of prediction residuals to generate a first 2D (two-dimensional) coefficient block;

determining a total number of non-zero first coefficients in a partial block of the first 2D coefficient block, wherein the partial block of the first 2D coefficient block is smaller than the first 2D coefficient block, wherein a count of the total number of non-zero first coefficients in the partial block of the first 2D coefficient block excludes a DC coefficient located at a top-left corner of the first 2D coefficient block;

when the total number of non-zero first coefficients in the partial block of the first 2D coefficient block satisfies a target condition:

converting the first 2D coefficient block to a first 1D (one-dimensional) coefficient vector;

applying a second transform to at least part of the first 1D coefficient vector to generate a second 1D coefficient vector, wherein the second transform corresponds to a non-separable transform;

converting the second 1D coefficient vector to a second 2D coefficient block according to a coefficient scanning order; and providing the second 2D coefficient block as a final 2D coefficient block; and when the total number of non-zero first coefficients in the partial block of the first 2D coefficient block does not satisfy the target condition:

providing the first 2D coefficient block as the final 2D coefficient block.

12. The method of claim 11, wherein the target condition corresponds to the total number of non-zero first coefficients in the partial block of the first 2D coefficient block being greater than a threshold.

13. The method of claim 11, wherein the partial block of the first 2D coefficient block corresponds to a top-left M×N block of the first 2D coefficient block, and wherein M is one positive integer smaller than a width of the first 2D coefficient block and N is one positive integer smaller than a height of the first 2D coefficient block.

14. The method of claim 13, wherein M and N are selected from a group comprising 4, 8 and 16.

15. The method of claim 11, wherein the block of prediction residuals comprises one luma block and one or more chroma blocks, and one 2D luma coefficient block and one or more 2D chroma coefficient blocks are generated, and wherein said determining the total number of non-zero first coefficients counts only non-zero AC coefficients associated with said one or more 2D chroma coefficient blocks.

16. The method of claim 15, wherein said determining the total number of non-zero first coefficients counts only non-zero AC coefficients for each of said one or more 2D chroma coefficient blocks and selects a maximum number of non-zero AC coefficients as the total number of non-zero first coefficients.

17. An apparatus for encoding video data, the apparatus comprising one or more electronic circuits or processors arranged to:

receive a block of prediction residuals corresponding to differences between a block of video data being coded and a predictor;

apply a first transform to the block of prediction residuals to generate a first 2D (two-dimensional) coefficient block;

determine a total number of non-zero first coefficients in a partial block of the first 2D coefficient block, wherein the partial block of the first 2D coefficient block is smaller than the first 2D coefficient block, wherein a count of the total number of non-zero first coefficients in the partial block of the first 2D coefficient block excludes a DC coefficient located at a top-left corner of the first 2D coefficient block;

when the total number of non-zero first coefficients in the partial block of the first 2D coefficient block satisfies a target condition:

convert the first 2D coefficient block to a first 1D (one-dimensional) coefficient vector;

apply a second transform to at least part of the first 1D coefficient vector to generate a second 1D coefficient vector, wherein the second transform corresponds to a non-separable transform; and convert the second 1D coefficient vector to a second 2D coefficient block according to a coefficient scanning order; and provide the second 2D coefficient block as a final 2D coefficient block; and when the total number of non-zero first coefficients in the partial block of the first 2D coefficient block does not satisfy the target condition:

provide the first 2D coefficient block as the final 2D coefficient block.

18. A method for decoding video data incorporating non-separable secondary transform (NSST), the method comprising:

receiving a final 2D (two-dimensional) coefficient block corresponding to differences between a block of video data being decoded and a predictor;

determining a total number of non-zero first coefficients in a partial block of the final 2D coefficient block, wherein the partial block of the final 2D coefficient block is smaller than the final 2D coefficient block, and wherein a count of the total number of non-zero first coefficients in the partial block of the final 2D coefficient block excludes a DC coefficient located at a top-left corner of the final 2D coefficient block;

when the total number of non-zero first coefficients in the partial block of the final 2D coefficient block satisfies a target condition:

converting the final 2D coefficient block to a first 1D (one-dimensional) coefficient vector;

applying a first transform to at least part of the first 1D coefficient vector to generate a second 1D coefficient vector, wherein the first transform corresponds to a non-separable transform;

converting the second 1D coefficient vector to a first 2D coefficient block according to a coefficient scanning order;

applying a second transform to the first 2D coefficient block to generate a second 2D coefficient block; and recovering the block of video data according to the second 2D coefficient block; and when the total number of non-zero first coefficients in the partial block of the final 2D coefficient block does not satisfy the target condition:

applying the second transform to the final 2D coefficient block to generate a third 2D coefficient block; and recovering the block of video data according to the third 2D coefficient block.

19. The method of claim 18, wherein the target condition corresponds to the total number of non-zero first coefficients in the partial block of the final 2D coefficient block being greater than a threshold.

20. The method of claim 18, wherein the partial block of the final 2D coefficient block corresponds to a top-left M×N block of the final 2D coefficient block, and wherein M is one positive integer smaller than a width of the final 2D coefficient block and N is one positive integer smaller than a height of the final 2D coefficient block.

21. The method of claim 20, wherein M and N are selected from a group comprising 4, 8 and 16.

22. The method of claim 18, wherein the final 2D coefficient block corresponds to one 2D luma coefficient block and one or more 2D chroma coefficient blocks, and wherein said determining the total number of non-zero first coefficients counts only non-zero AC coefficients associated with said one or more 2D chroma coefficient blocks.

23. The method of claim 22, wherein said determining the total number of non-zero first coefficients counts only non-zero AC coefficients for each of said one or more 2D chroma coefficient blocks and selects a maximum number of non-zero AC coefficients as the total number of non-zero first coefficients.

24. An apparatus for decoding video data, the apparatus comprising one or more electronic circuits or processors arranged to:
- receive a final 2D (two-dimensional) coefficient block corresponding to differences between a block of video data being decoded and a predictor;
- determine a total number of non-zero first coefficients in a partial block of the final 2D coefficient block, wherein the partial block of the final 2D coefficient block is smaller than the final 2D coefficient block, and wherein a count of the total number of non-zero first coefficients in the partial block of the final 2D coefficient block excludes a DC coefficient located at a top-left corner of the final 2D coefficient block;
- when the total number of non-zero first coefficients in the partial block of the final 2D coefficient block satisfies a target condition:
  - convert the final 2D coefficient block to a first 1D (one-dimensional) coefficient vector;
  - apply a first transform to at least part of the first 1D coefficient vector to generate a second 1D coefficient vector, wherein the first transform corresponds to a non-separable transform;
  - convert the second 1D coefficient vector to a first 2D coefficient block according to a coefficient scanning order;
  - apply a second transform to the first 2D coefficient block to generate a second 2D coefficient block; and
  - recover the block of video data according to the second 2D coefficient block; and
- when the total number of non-zero first coefficients in the partial block of the final 2D coefficient block does not satisfy the target condition:
  - apply the second transform to the final 2D coefficient block to generate a third 2D coefficient block; and
  - recover the block of video data according to the third 2D coefficient block.

* * * * *